Figure 9:
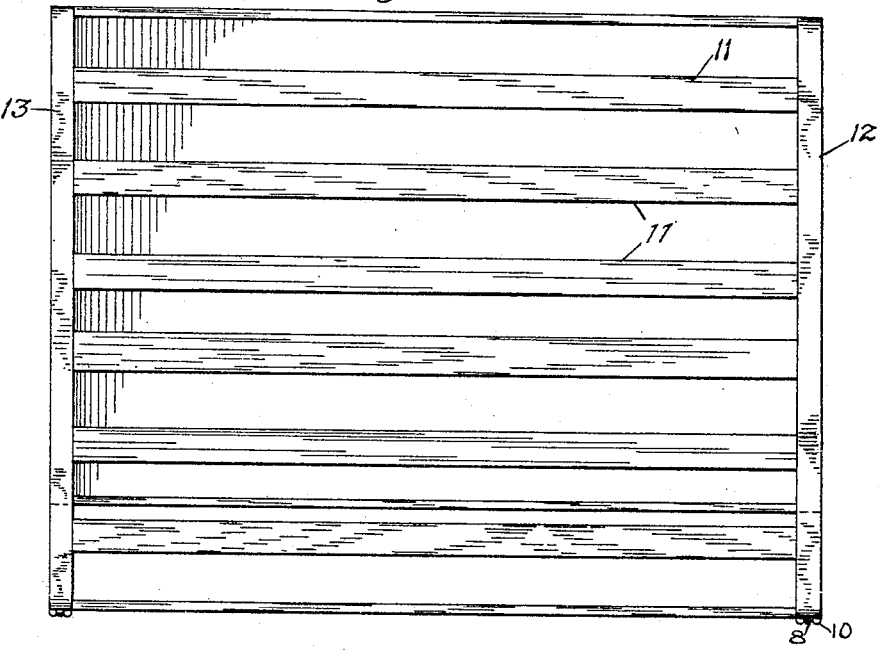

No. 777,732. PATENTED DEC. 20, 1904.
W. H. JUDSON & J. B. WATSON.
POULTRY CAR.
APPLICATION FILED MAY 16, 1904.
NO MODEL. 6 SHEETS—SHEET 1.
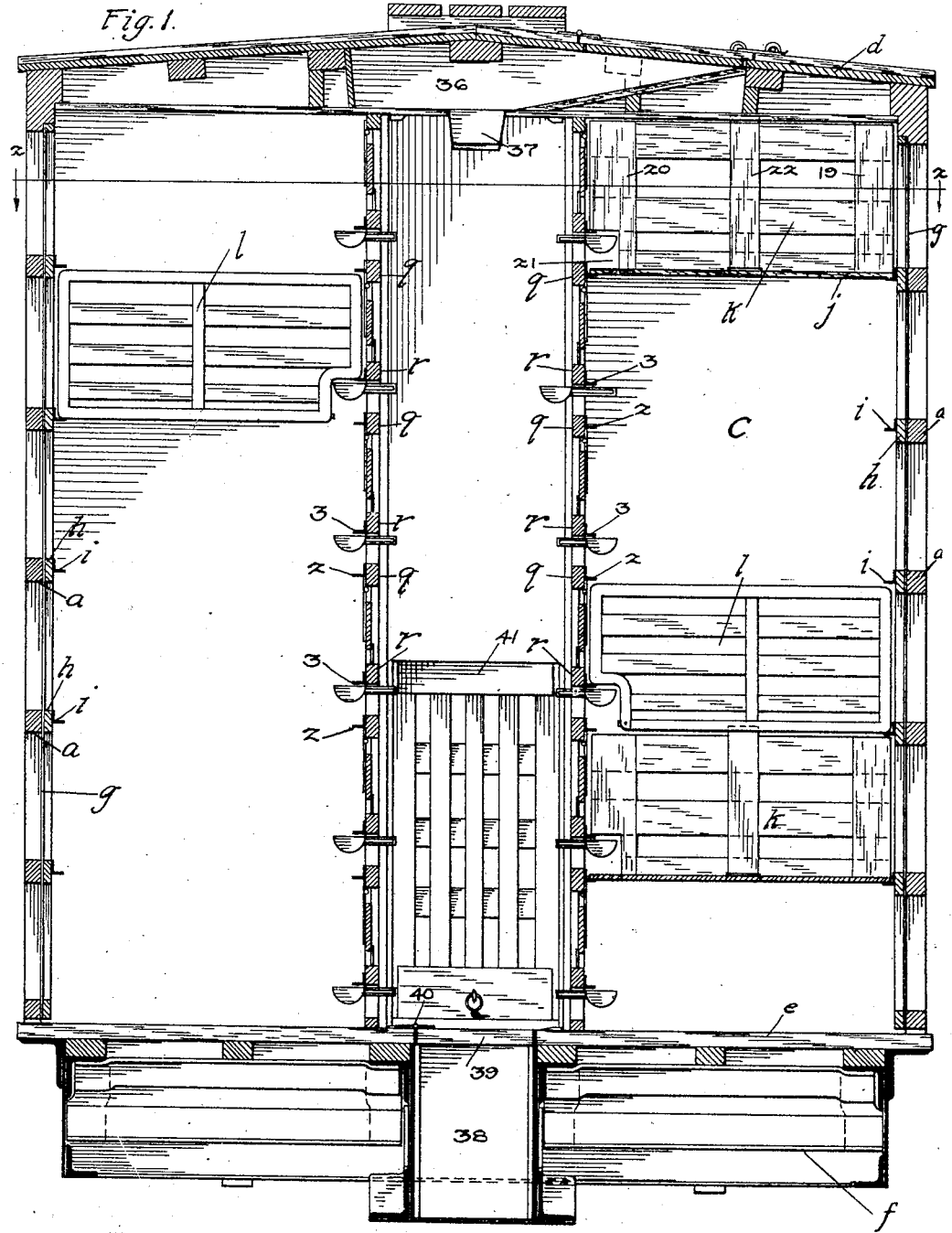
WITNESSES:
Harry J. Cromer
Anna L. Savoie
INVENTORS
Walter H. Judson
John Brown Watson
BY Thomas V. Sheridan
ATTORNEY

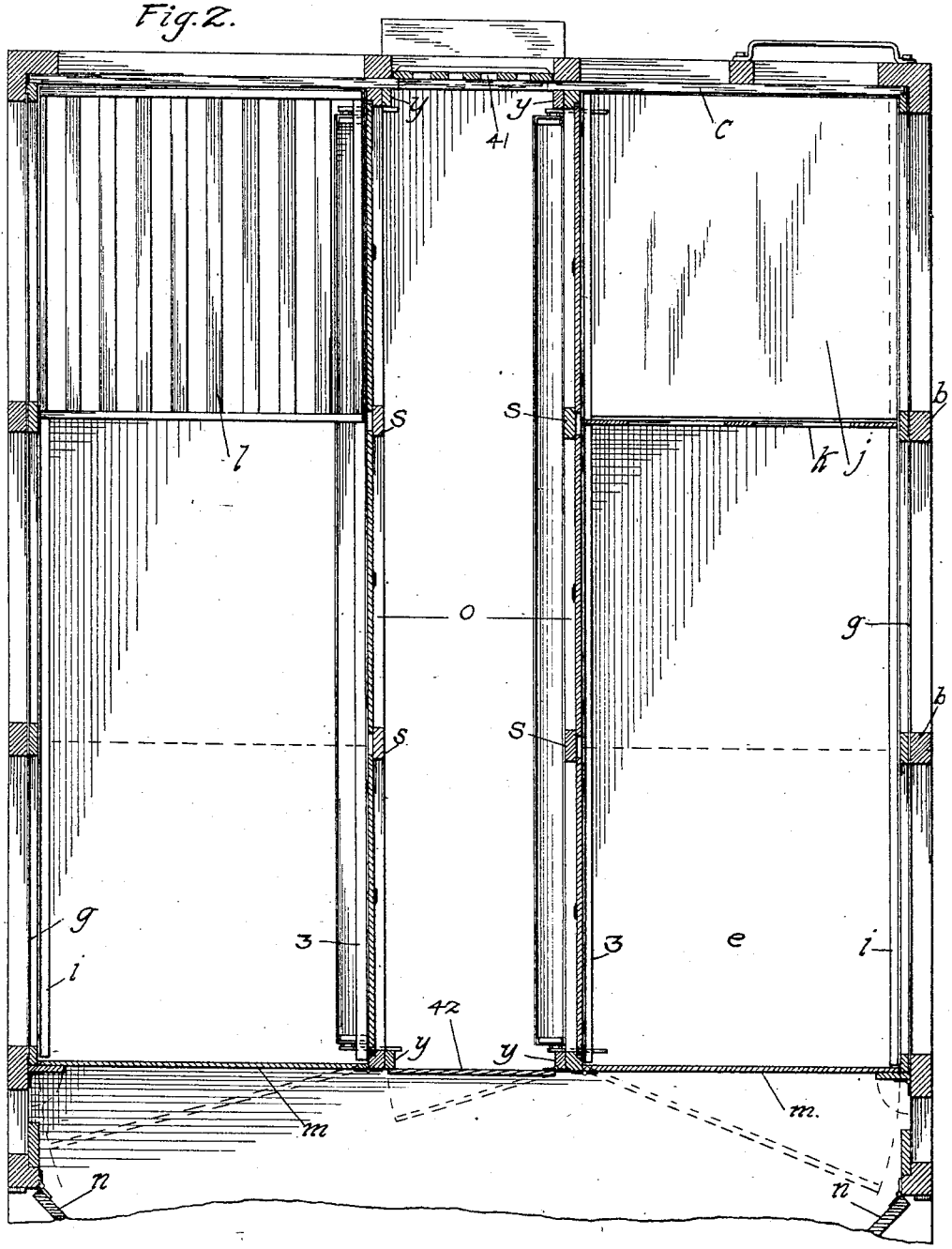

No. 777,732. PATENTED DEC. 20, 1904.
W. H. JUDSON & J. B. WATSON.
POULTRY CAR.
APPLICATION FILED MAY 16, 1904.
NO MODEL. 6 SHEETS—SHEET 3.
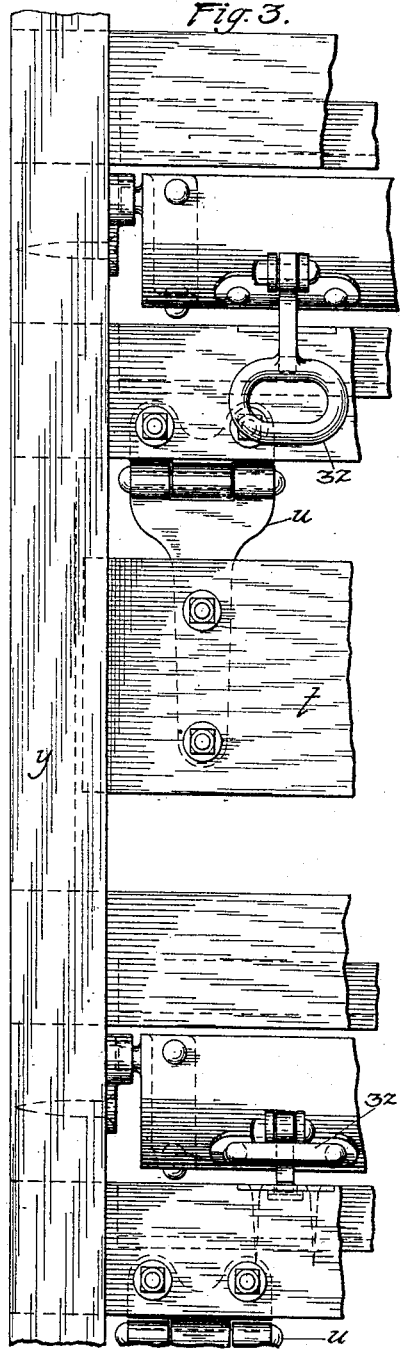
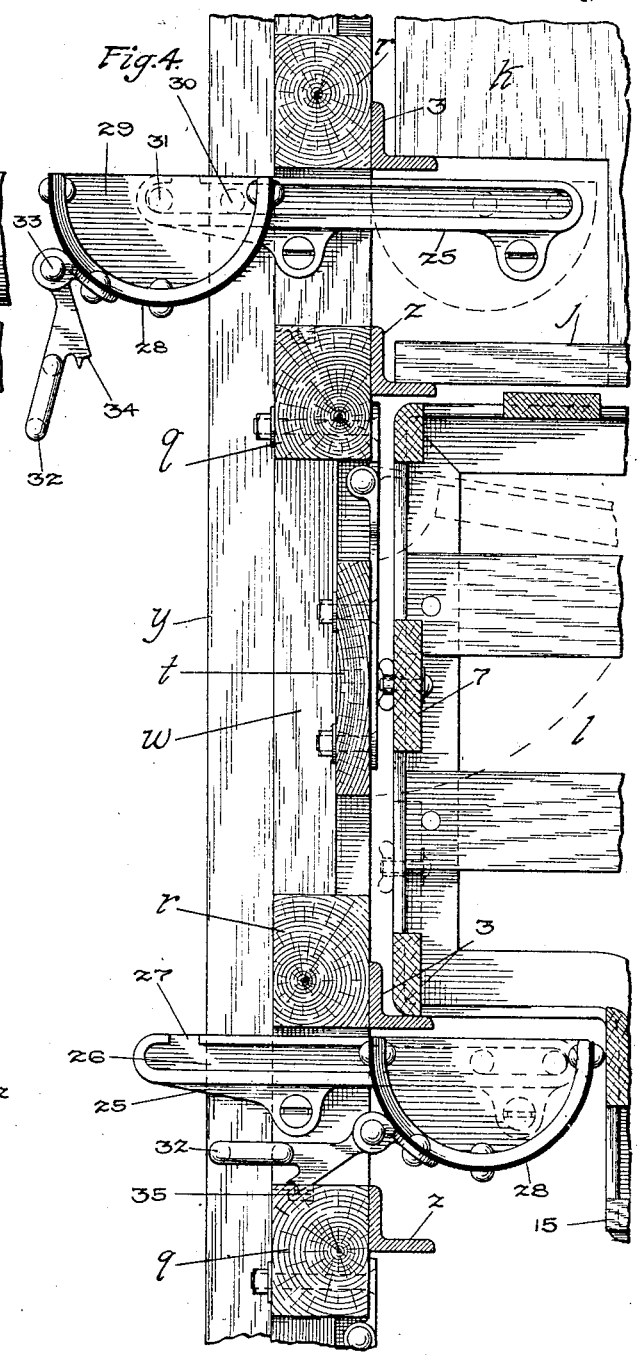
WITNESSES:
INVENTORS
Walter H. Judson and
John Brown Watson.
BY
ATTORNEY No. 777,732. PATENTED DEC. 20, 1904.
W. H. JUDSON & J. B. WATSON.
POULTRY CAR.
APPLICATION FILED MAY 16, 1904.
NO MODEL. 6 SHEETS—SHEET 4.
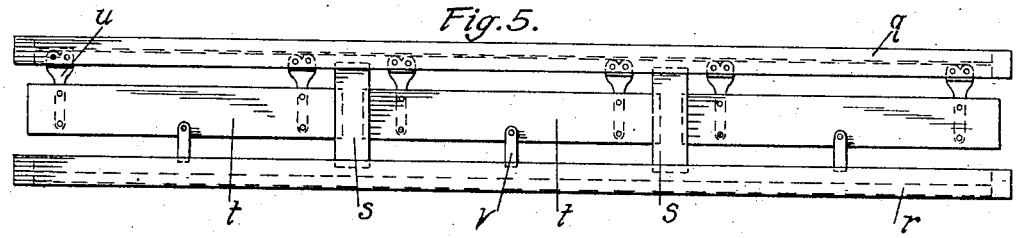
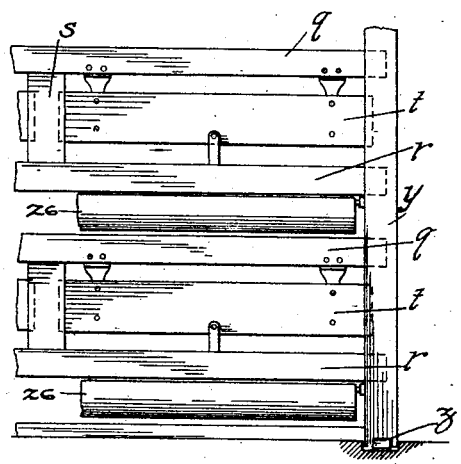
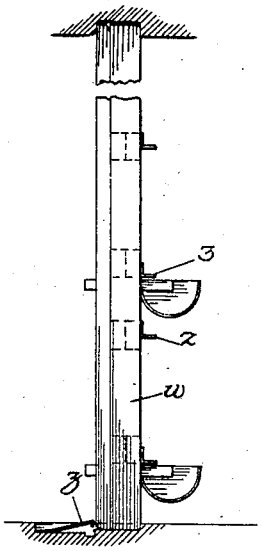
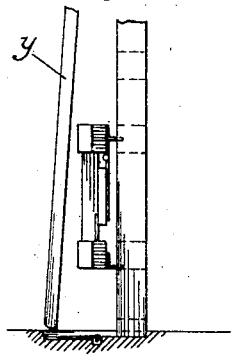
WITNESSES:
Harry J Romer
Anna L. Savoie
INVENTORS
Walter H. Judson and
John Brown Watson.
BY
Thomas Sheridan
ATTORNEY No. 777,732. PATENTED DEC. 20, 1904.
W. H. JUDSON & J. B. WATSON.
POULTRY CAR.
APPLICATION FILED MAY 16, 1904.
NO MODEL. 6 SHEETS—SHEET 5.

WITNESSES:
Harry J. Cromer
Anna L. Savoie

INVENTORS
Walter H. Judson
John Brown Watson.
BY
Thomas F. Sheridan
ATTORNEY

No. 777,732. PATENTED DEC. 20, 1904.
W. H. JUDSON & J. B. WATSON.
POULTRY CAR.
APPLICATION FILED MAY 16, 1904.
NO MODEL. 6 SHEETS—SHEET 6.

WITNESSES:
Harry J. Cromer
Anna L. Savoie

INVENTORS
Walter H. Judson
John Brown Watson.
BY
Thomas Sheridan
ATTORNEY

No. 777,732.                                            Patented December 20, 1904.

UNITED STATES PATENT OFFICE.

WALTER H. JUDSON AND JOHN BROWN WATSON, OF CHICAGO, ILLINOIS.

POULTRY-CAR.

SPECIFICATION forming part of Letters Patent No. 777,732, dated December 20, 1904.

Application filed May 16, 1904. Serial No. 208,251.

*To all whom it may concern:*

Be it known that we, WALTER H. JUDSON and JOHN BROWN WATSON, citizens of the United States, residing at Chicago, in the county of Cook and State of Illinois, have invented certain new and useful Improvements in Poultry-Cars, of which the following is a specification.

Our invention relates to that class of poultry-cars having removable partitions adapted to divide it into compartments of the desired size.

The principal object of the invention is to provide a simple, economical, sanitary, and efficient poultry-car.

A further object is to provide a poultry-car with removable partition-walls extending longitudinally thereof formed of separately-removable sections and with means for holding any desired number of transverse partitions and compartment-bottoms, so as to divide the space into the desired number of compartments of uniform or various sizes.

A further object is to provide longitudinal partition-walls formed of separately-removable sections adapted to divide the car longitudinally into compartments of any desired height, leaving the remaining portion above such longitudinal walls undivided, and having means for removably holding transverse partitions, compartment-bottoms, and removable crates in position, so as to permit such compartment-partitions and crates to be readily interchanged.

A further object is to provide, in a poultry-car having a multiplicity of compartments, suitable troughs and means for permitting them to be readily removed from such compartments and cleaned and filled and then returned to the compartments in position to permit fowls to feed therefrom; also, to provide means whereby each trough may serve for a plurality or tier of compartments and be moved into and out of such compartments as desired.

A further object is to provide means for permitting access to the removable crates while in position.

Other and further objects of the invention will appear from an examination of the drawings and the following description and claims.

The invention consists in the features, combinations, and details of construction hereinafter described and claimed.

Figure 10:
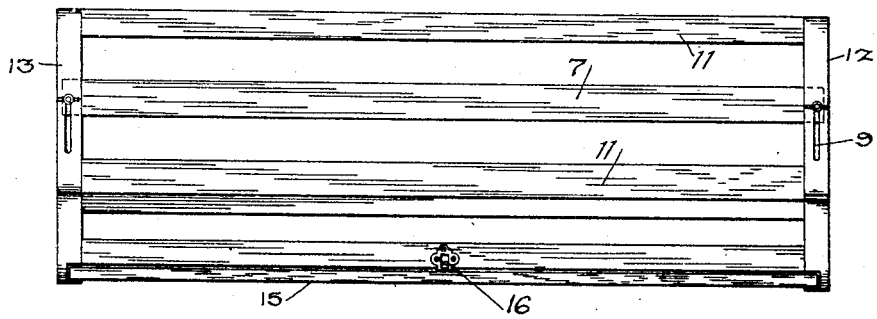
Figure 11:
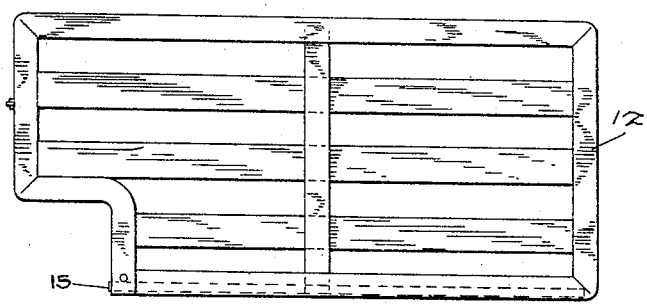
Figure 12:
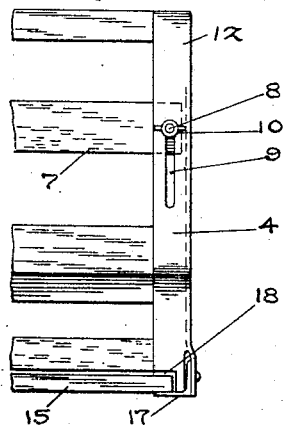
Figure 13:
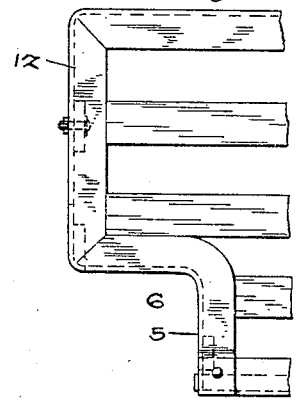
Figure 14:
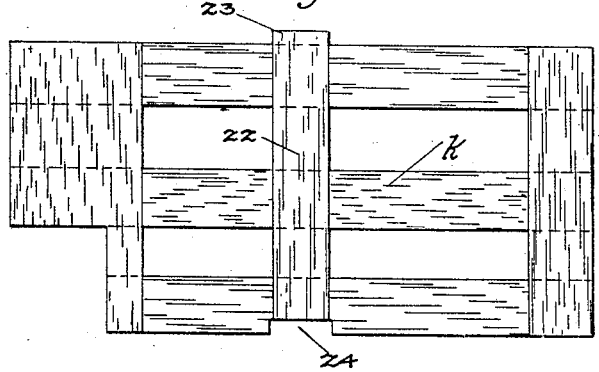
Figure 15:

In the accompanying drawings, Figure 1 is a transverse sectional elevation of a car constructed in accordance with our improvements, showing removable transverse compartment partitions and floors in position on the right-hand side of the figure, there being a crate therebetween and a removable and interchangeable crate in position on the left-hand side; Fig. 2, a plan view taken on line 2 of Fig. 1, showing a removable compartment-bottom on one side of the car and a plan view of a crate on the other side, the spaces for four vertical rows of crates or partitions being vacant; Fig. 3, an enlarged broken detail view showing the manner of mounting the troughs in the longitudinal partitions and also the arrangements of the doors upon the removable longitudinal-wall sections; Fig. 4, a similar view showing the means for holding the interchangeable crates and compartment-partitions and a pair of the troughs, one being outside of the compartments and the other in position to extend through the compartments; Fig. 5, a longitudinal view in elevation of one of the removable sections of a longitudinal partition-wall; Fig. 6, a detail view showing the manner of mounting the removable sections of the longitudinal partition-walls in the uprights; Fig. 7, an end elevation of one of such longitudinal partition-walls with the removable sections in position; Fig. 8, a view of the lower portion of the parts shown in Fig. 7 with the end of one of the removable sections and the vertical securing-cleat as they appear in the act of being removed or placed in position; Fig. 9, a plan view of a crate; Fig. 10, a side elevation of the crate shown in Fig. 9; Fig. 11, an end elevation of the crate shown in Fig. 9 looking at it from the right; Fig. 12, a broken elevation of a portion of the side of the crate shown in Fig. 10; Fig. 13, an end view in elevation of a portion of the crate shown in Fig. 12; Fig. 14, a detail view of one of the removable transverse compartment-partitions, and Fig. 15 an end view of the transverse compartment-partition shown in Fig. 14.

In constructing a poultry-car in accordance with our improvements we provide a car having side frames formed of horizontal plate-rails $a$ and uprights $b$, end walls $c$, a roof $d$, and a floor $e$, all mounted upon suitable underframing $f$. These may be of any ordinary and well-known type, except that the side walls are preferably open-work in the form of the horizontal plate-rails and uprights already described, suitable sheathing $g$, formed, preferably, of reticulated metal or expanded metal, being mounted on the inner side of such side walls and forming a part thereof.

It is desirable that means be provided for dividing the space inclosed within the outer walls of the car into compartments of any desired size and also that all of the partitions and dividing-walls may be readily removed to permit them to be cleaned and the car thoroughly renovated. It is also desirable that means be provided for permitting the crates and transverse compartment-partitions to be interchangeably arranged throughout the car in any desired manner, so that the entire car may be divided into compartments formed by transverse partitions and compartment-bottoms when desired or entirely filled with crates or in part with crates and in part divided by transverse compartment partititions and bottoms, as desired. In order to accomplish this, suitable longitudinal cleats $h$ are mounted inside the side walls of the car, and supporting-brackets $i$, formed of angle-irons, are arranged at suitable intervals upon such cleats along the side walls of the car, so as to form supports for one side of the compartment-bottoms $j$ and transverse partitions $k$ or for such crates as it may be desirable to mount in lieu thereof. These crates and transverse compartment partitions and bottoms will be more particularly hereinafter described.

The general arrangement of the car which we prefer will be understood by reference to Figs. 1 and 2, Fig. 1 showing the car in transverse elevation, and Fig. 2 showing one end of the car, the figure being broken away at about the longitudinal center of the car. Both ends of the car being preferably identical, the illustration and description of one end thereof will be sufficient to enable the invention to be understood. We prefer to divide the car at substantially its longitudinal center by transversely-extending doors $m$ and $n$, which form an aisle therebetween extending transversely across the car. Each end of the car, between the end walls and the longitudinal center thereof, is provided with a pair of removable longitudinal partition-walls $o$, each formed of separately-removable sections. These partitions form an aisle between them extending longitudinally of the car and preferably at its transverse center. It will be understood, however, that these partition-walls may be so arranged as to form aisles through any desired part of the car, either along the sides or center or even extending transversely of the car.

Each of the partition-walls $o$ is formed of a plurality of removable partition-wall sections, one of which is illustrated in Fig. 5. Each of these sections is formed of an upper rail $q$ and a lower rail $r$, connected together by strips $s$, such strips being arranged at the desired intervals, preferably one for each compartment or crate in the tier represented by such partition-wall section. Swinging doors $t$ are hinged to the upper rail by means of hinges $u$, so as to swing inwardly, each end of such doors overlapping the strips which connect the upper and lower rails, so as to be thereby prevented from swinging outward when in closed position. They are held in closed position and prevented from swinging inward, except when desired, by means of suitable latches $v$. These partition-wall sections are arranged one above the other, so as to form a complete partition-wall, by mounting the opposite ends of the upper and lower rails of such sections in uprights $w$, which are preferably removably mounted in the car and extend from the floor to the ceiling, the uprights being provided with suitable notches for receiving the ends of such rails. Vertical securing-cleats $y$ are mounted on the outside of these uprights and are each removably held in position at the bottom by means of a spring $z$ in the floor, the upper ends of such cleats being inserted in suitable notches in the ceiling, so that when they are in position they hold the ends of the rails or the removable partition-sections securely in position in the uprights. All of the above-described parts are readily removable. This enables the car to be entirely dismantled and all the parts cleaned and replaced in position whenever it is desirable to renovate the car.

Suitable supporting-brackets 2, made preferably of angle-irons, extending the entire length of the longitudinal partition-sections, are mounted upon the upper rails of each of such sections, on the inner side thereof, so that when the section is mounted in operative position such bracket is on a level with one of the brackets $i$, extending along the longitudinal side frame of the car. These brackets form supports for the removable transverse partitions $k$ and compartment-bottoms $j$, and similar brackets 3, formed of angle-irons, are mounted above the troughs upon the lower rails of each of the longitudinal partition-wall sections and form supports for the inner side of the crates $l$. A plurality of these crates may be arranged back of each of the partition-wall sections, their outer sides being supported by a bracket $i$ and their inner sides by a bracket 3 upon the corresponding partition-wall section. The crates thus form a tier of separate compartments back of each of the partition-wall sections. Each of these crates is formed of side frames 4, having a receding lower portion 5, forming a recess 6 for admitting a trough for the purpose of feeding the fowls, and a removable slat 7 is slidably mounted in such side frame, being held removably in closed position by means of a bolt 8 at each end thereof. These bolts extend through a slot 9 in the upright portion of the side frames, a suitable nut 10 being mounted in threaded engagement with such bolt and adapted to engage the upright portion of the side frame. The opposite side and top of the crate are formed of slats 11, which extend transversely across the crate at the desired intervals and are attached at their opposite ends to the end frames 12 and 13, which are also formed of slats. A bottom 15 is removably mounted between the side and end frames and held in position by means of a latch 16, being supported upon an angle-iron 17 at the bottom of each end of the crate, a suitable notch 18 being provided for admitting the end of the bottom, so as to permit it to slide back and forth upon the angle-irons. The bottom may thus be readily removed for the purpose of cleaning it or for any purpose.

It is well known in the art that fowls to be shipped are not always crated and that it is often necessary to provide compartments for such fowls as it is not desirable to crate. We therefore provide a multiplicity of removable transverse partitions $k$ and partition-bottoms $j$. These partition-bottoms are removably mounted upon the supporting-brackets 2 and $i$. The partitions $k$ are formed, preferably, of longitudinal slats connected by end cleats 19 and 20, the latter being provided with a notch 21 at its lower end for admitting a trough from which the fowls are to be fed. A center locking-cleat 22 is also provided extending across the horizontal slats, having a projecting upper end portion 23 for holding the partition in place. The lower end of such center cleat and the bottom longitudinal slat is cut away, so as to form a notch 24 for receiving the projecting end portion of a similar locking-cleat on the next partition below. These projecting end portions of the center cleats 22 extend between the compartment-bottoms when such bottoms are in position, and thus serve to hold the upright partitions in position with relation to each other and with relation to the bottoms, the center cleat of the partition nearest the ceiling of course extending into the ceiling in lieu of a bottom. By this arrangement it will be readily seen that any desired number of transverse partitions and compartment-bottoms may be arranged back of each section of the sectional partition-wall and that the crates and transverse compartment partitions and bottoms are interchangeable and may be arranged in any order desired and in the same or different tiers, as desired. In any case, whether compartment partitions and bottoms or crates are used, there is a plurality of separate compartments formed in each tier, and it is very desirable that means be provided whereby the separate compartments of each tier may be supplied with the necessary food and drink for the fowls contained therein by means of a single trough and that such trough be adapted to be readily removed, cleaned, filled, and replaced in position so as to extend through all of the compartments of a tier. In order to accomplish this, suitable trough-brackets 25 are mounted, preferably, upon the uprights in which the removable partition-sections are supported, being preferably between such removable partition-sections. Each of these brackets is provided with a horizontal slot 26, having an opening 27 at its outer end. Suitable troughs 28, formed, preferably, of sheet metal and extending the entire length of the removable partition-sections, are provided, each inclosing end portions 29. Projecting dowels 30 and 31 on each end of the troughs extend slidably into the horizontal slot of the trough-brackets to slidably support the troughs in the brackets. Suitable handles 32 are pivotally mounted on the troughs by means of pivots 33, and a locking-stud 34 is provided on the under side of these handles adapted to enter a slot 35 in the partition-wall for holding the trough in operative position and permitting it to be readily removed. By this arrangement it will be seen that when the trough is in operative position it extends through a plurality of the compartments, or, in other words, through the entire tier of compartments formed either of crates or by means of transverse partitions and compartment-bottoms, and that a trough may be readily removed when desired and is efficiently held in operative position.

A feed-chamber 36 is provided at the top of the car formed by and between the roof and ceiling and having a chute 37 for permitting the grain to be removed therefrom. A suitable compartment 38 is provided between the longitudinal center sills of the supporting-framework of the car for storing away the transverse compartment partitions and bottoms when desired, a suitable trap-door 39 being arranged in the floor upon hinges 40 for this purpose. A gate 41 at each end of the car serves to close the end of the center aisle formed between the longitudinal partition-walls, and a suitable door 42 is provided at the inner end of each aisle.

In operation the longitudinal partition-walls may be built to any desired height, and any desired number of compartments may be formed between such partition-walls and the longitudinal side walls of the car. In forming the compartments by means of the transverse partitions and compartment-bottoms a bottom is placed upon the desired brackets, and the desired number of fowls being placed in the compartment a partition is mounted in place and the next compartment bottom and partition then arranged in a similar manner until the desired number of compartments are formed and loaded. Any desired number of crates are mounted in any desired tier or tiers, and each of the crates being provided, as already described, with a movable slat on the side adjacent to the longitudinal partition-wall the door in such partition-wall may be opened inwardly when such slat is lowered to its lowermost position, as indicated in dotted lines in Fig. 4. All of the compartments, whether formed by crates or partitions and partition-bottoms, are thus rendered accessible to the attendant for any case of emergency which may require or render it desirable to have access to the respective compartments. It is thus possible to arrange compartments of any desired size and to arrange partitions and crates interchangeably, as desired. A single trough serves for all of the compartments in a tier, and all of the partitions, crates, troughs, and movable parts can be readily removed and the car entirely dismantled and renovated in a very short time.

We claim—

1. In a car of the class described, the combination of outer walls, a partition-wall, and a plurality of partitions and compartment-bottoms removably mounted adjacent to and extending laterally from such partition-wall, substantially as described.

2. In a car of the class described, the combination of end and side walls, longitudinal partition-walls extending substantially parallel to such side walls, and a plurality of transverse vertical partitions and horizontal compartment-bottoms removably mounted between such partition-walls and the side walls of the car, substantially as described.

3. In a car of the class described, the combination of end and side walls, a removable partition-wall formed of separately-removable sections and extending substantially parallel with the adjacent outer wall of the car, and means for dividing the space between such partition-wall and the adjacent wall into compartments, substantially as described.

4. In a car of the class described, the combination of end and side walls, a removable partition-wall formed of separately-removable sections and extending substantially parallel with the adjacent outer wall of the car, means for dividing the space between such partition-wall and the adjacent wall, and transverse vertical partitions and horizontal compartment-bottoms removably mounted between such sectional longitudinal partition-wall and the adjacent wall of the car, substantially as described.

5. In a car of the class described, the combination of a partition-wall provided with openings therethrough for admitting troughs, means for dividing the space on one side of such partition-wall into compartments, and a trough movably mounted upon such partition-wall and extending through a plurality of such compartments and movable from such compartments to the opposite side of the partition-wall, substantially as described.

6. In a car of the class described, the combination of a partition-wall provided with openings therethrough for admitting troughs, means for dividing the space on one side of such partition-wall into compartments, trough-brackets upon the partition-wall, and troughs movably mounted upon such trough-brackets and extending through a plurality of the compartments in one position and along the opposite side of the partition-wall and outside of the compartments in a second position, substantially as described.

7. In a car of the class described, the combination of a plurality of longitudinal walls, brackets mounted upon such walls in different vertical planes, a plurality of transverse partitions and compartment-bottoms removably mounted upon such brackets and dividing the space between the longitudinal walls into compartments, and a movable trough extending through a plurality of such compartments and movable therefrom to the opposite side of the adjacent longitudinal wall, substantially as described.

8. In a car of the class described, the combination of end walls and side walls, a partition-wall provided with openings therethrough for admitting troughs, transverse partitions and compartment-bottoms movably mounted between such longitudinal partition-wall and the side walls of the car, and a plurality of troughs mounted upon such partition-wall and movable through the openings therein to the opposite side thereof, each of such troughs extending through a plurality of such compartments in one position and along the opposite side of the partition-wall in a second position, substantially as described.

9. In a car of the class described, the combination of end walls and side walls, a partition-wall provided with openings therethrough for admitting troughs, transverse partitions and compartment-bottoms removably mounted between such longitudinal partition-wall and the side walls of the car, trough-brackets mounted upon such longitudinal partition-wall, and troughs slidably mounted upon such trough-brackets and extending through a plurality of the compartments formed by such transverse partitions and compartment-floors in one position and along the opposite side of such partition-wall outside of the compartments in a second position, substantially as described.

10. In a car of the class described, the combination of a partition-wall formed of uprights and a plurality of separately-removable sections mounted in such uprights and forming a space therebetween for receiving a trough, means for dividing the space on one side of such partition-wall into compartments, and a trough mounted in such partition-wall movable between the separately-removable sections thereof and extending through a plurality of the compartments in one position and on the opposite side of the partition-wall and outside of the compartments in a second position, substantially as described.

11. In a car of the class described, the combination of a partition-wall formed of separately-removable sections and provided with openings between such sections for admitting troughs, uprights in which such sections are removably mounted, trough-brackets mounted upon such uprights between such removable sections, and troughs slidably mounted upon such trough-brackets, substantially as described.

12. In a car of the class described, the combination of end walls and side walls, a partition-wall provided with openings therethrough for admitting troughs, transverse partitions and compartment-bottoms arranged between such longitudinal partition-wall and the side walls of the car, and troughs movably mounted upon such partition-wall and extending through a plurality of such compartments in one position and on the opposite side of the partition-wall in a second position, substantially as described.

13. In a car of the class described, the combination of end walls and side walls, a longitudinal partition-wall formed of separately-removable sections, supporting-brackets arranged along the sides of such partition-wall and the side wall of the car, trough-brackets mounted upon the partition-wall intermediate the removable sections thereof, troughs slidably mounted upon such trough-brackets, and a plurality of compartment partitions and bottoms mounted upon such supporting-brackets and forming a plurality of compartments for each trough, substantially as described.

14. In a car of the class described, the combination of end walls and longitudinal side walls, a plurality of longitudinal partition-walls each provided with openings therethrough for admitting troughs, supporting-brackets mounted upon such longitudinal walls in different vertical planes, a plurality of transverse partitions, and compartment-bottoms removably mounted upon such brackets and dividing the space between the longitudinal walls into compartments, trough-brackets mounted upon such longitudinal partition-walls, and troughs slidably mounted upon such trough-brackets and each extending through a plurality of such compartments in one position and movable upon such brackets to a position outside of the compartments, substantially as described.

15. In a car of the class described, the combination of end walls and longitudinal side walls, a longitudinal partition-wall formed of separately-removable sections each provided with brackets upon one side thereof and having openings therebetween for admitting troughs, trough-brackets mounted between the removable sections of such longitudinal partition-wall, and troughs slidably mounted upon such trough-brackets, substantially as described.

16. In a car of the class described, the combination of end walls and side walls, a longitudinal partition-wall formed of separately-removable sections each provided with brackets formed of angle-iron upon one side thereof and having openings therebetween for admitting troughs, uprights in which such sections are removably mounted, trough-brackets mounted upon such uprights between the removable sections, troughs slidably mounted upon such trough-brackets, and a plurality of partitions and compartment-bottoms mounted upon such angle-iron brackets and forming a plurality of compartments for each trough, substantially as described.

17. In a car of the class described, the combination of end walls and side walls, a longitudinal partition-wall formed of separately-removable sections each provided with brackets arranged upon one side thereof and having openings therebetween for admitting a trough, trough-brackets mounted upon such longitudinal partition-wall, a trough slidably mounted upon such trough-brackets, and a plurality of transverse partitions and compartment-bottoms removably mounted upon such supporting-brackets and forming separate compartments, substantially as described.

18. In a car of the class described, the combination of end walls and side walls, longitudinal partition-walls provided with supporting-brackets and having openings through such partition-walls for admitting troughs, trough-brackets mounted upon such longitudinal partition-walls, a plurality of troughs slidably mounted upon such trough-brackets, and a plurality of transverse partitions and compartment-bottoms removably mounted upon such supporting-brackets forming a plurality of compartments through which such troughs extend, substantially as described.

19. In a car of the class described, the combination of end walls and side walls, longitudinal partition-walls provided with supporting-brackets mounted thereon and having openings therethrough for admitting troughs, trough-brackets mounted upon such longitudinal partition-walls, a plurality of troughs slidably mounted upon such trough-brackets, and a plurality of transverse partitions and compartment-bottoms removably and interchangeably mounted upon such supporting-brackets, substantially as described.

WALTER H. JUDSON.
JOHN BROWN WATSON.

Witnesses:
THOMAS F. SHERIDAN,
HARRY I. CROMER.